(12) United States Patent
Van Dijk

(10) Patent No.: US 11,522,462 B2
(45) Date of Patent: Dec. 6, 2022

(54) SWITCH MODE POWER CONVERTER

(71) Applicant: SIGNIFY HOLDING B.V., Eindhoven (NL)

(72) Inventor: Bernhard Christiaan Van Dijk, Geldrop (NL)

(73) Assignee: Signify Holding B.V., Eindhoven (NL)

(*) Notice: Subject to any disclaimer, the term of this patent is extended or adjusted under 35 U.S.C. 154(b) by 0 days.

(21) Appl. No.: 17/296,563

(22) PCT Filed: Nov. 19, 2019

(86) PCT No.: PCT/EP2019/081828
§ 371 (c)(1),
(2) Date: May 25, 2021

(87) PCT Pub. No.: WO2020/109090
PCT Pub. Date: Jun. 4, 2020

(65) Prior Publication Data
US 2022/0029544 A1 Jan. 27, 2022

(30) Foreign Application Priority Data
Nov. 30, 2018 (EP) .................................. 18209522

(51) Int. Cl.
*H02M 3/335* (2006.01)
*H05B 45/382* (2020.01)
*H02M 1/00* (2006.01)

(52) U.S. Cl.
CPC ...... *H02M 3/33571* (2021.05); *H05B 45/382* (2020.01); *H02M 1/0009* (2021.05)

(58) Field of Classification Search
CPC ............. H02M 1/0058; H02M 1/0009; H02M 1/0064; H02M 3/3376; H02M 1/007
See application file for complete search history.

(56) References Cited

U.S. PATENT DOCUMENTS

| | | | |
|---|---|---|---|
| 10,170,974 B1* | 1/2019 | Oh .......................... | H02M 1/32 |
| 2003/0227280 A1* | 12/2003 | Vinciarelli ............ | H02M 3/285 323/265 |
| 2011/0051467 A1* | 3/2011 | Nakanishi ......... | H02M 3/33571 363/21.02 |
| 2012/0001603 A1* | 1/2012 | Ouyang .............. | H02M 3/1588 323/271 |
| 2015/0124489 A1 | 5/2015 | Dai et al. | |
| 2015/0303817 A1* | 10/2015 | Rutgers ................ | H05B 45/382 363/21.04 |

* cited by examiner

*Primary Examiner* — Wei (Victor) Y Chan

(57) ABSTRACT

A switch mode power converter comprises an inverter, a transformer having a primary side winding and a secondary side winding and a first inductor in series with the primary side winding. A second inductor is provided magnetically coupled to the first inductor, and a voltage at one end of the second inductor is used as a feedback signal for indirectly measuring (i.e. approximating) the secondary side voltage, but with measurement at the primary side.

13 Claims, 5 Drawing Sheets

Isense

SWITCH MODE POWER CONVERTER

CROSS-REFERENCE TO PRIOR APPLICATIONS

This application is the U.S. National Phase application under 35 U.S.C. § 371 of International Application No. PCT/EP2019/081828, filed on Nov. 19, 2019, which claims the benefit of European Patent Application No. 18209522.4, filed on Nov. 30, 2018. These applications are hereby incorporated by reference herein.

FIELD OF THE INVENTION

This invention relates to switch mode power converters for example for use in LED drivers.

BACKGROUND OF THE INVENTION

Switch mode power converters are well known for use both in AC/DC and DC/DC conversion. Resonant converters for example have a resonant circuit, which can be a series or parallel resonant circuit. Resonant converters which comprise an LLC resonant circuit having two inductances and one capacitance, or having an LCC resonant circuit having two capacitances and one inductance, are well-known for use within LED drivers.

The switch mode power converter can be configured or operated as a constant current source or a constant voltage source. A constant current source can be used to drive an LED arrangement directly, thus enabling a single stage driver. Constant voltage sources can be used, for example, for LED modules which have further driver electronics in order to ensure a corresponding power supply to the LEDs. A predetermined current is then drawn from the output voltage provided by the constant voltage source.

Galvanic isolation is typically provided between the input and any outputs. A transformer is used to provide this isolation between the input power supply (typically a high voltage mains supply) and the load. The isolation requirements between the primary and secondary sides normally mean that the primary and secondary side windings of the transformer need to be physically separated or otherwise disposed such that the magnetic coupling between the primary and secondary side windings is not perfect. This imperfection in magnetic coupling manifests itself as leakage inductance of the output transformer.

In the application of LED drivers, current regulation is normally used, by which the switch mode power converter is controlled to deliver a desired LED current, at the secondary side. The regulation function also may be used to limit or control the output voltage being generated by the LED driver, for example in conditions when the LED load is (or becomes) disconnected from the driver.

It is then highly preferred that circuitry for measuring and limiting or controlling the driver output voltage should be disposed at the primary side of the driver rather than at the isolated secondary side of the driver. In the latter case, a signal needs to be brought from the isolated secondary side back to the primary side via a properly isolating path, such as via an opto-isolator.

Thus, primary side current and/or voltage regulation is more cost effective and robust over secondary side regulation. First, the high voltage or common mode insulation of the control circuit is not needed in the primary side control approach. Second, auxiliary circuitry for powering the control part is simplified. Moreover, being placed on the primary side, the regulation circuitry is capable of processing any information from the mains in a very simple and effective way.

Although the voltage at the primary side of the output transformer has a relation to the output voltage of the driver, that primary side signal is distorted because of the voltage drop across the leakage inductance of the output transformer.

In some cases a separate winding for output voltage sensing is disposed at the output transformer such that it has a magnetic coupling to the secondary side winding, and indeed a considerably better magnetic coupling than between normal primary and secondary side windings. It is then electrically connected to the primary side circuitry. This is feasible as long as no substantial power needs to be transferred via this sensing winding, hence no substantial current needs to flow in the sensing winding, and therefore no substantial voltage drop will occur across the sensing winding leakage inductance.

However, it is challenging to dispose such a sensing winding with sufficient magnetic coupling to the secondary side winding while maintaining creepage and clearances associated with the isolation requirements between the primary and secondary sides of the output transformer.

There is therefore a need for an improved primary side sensing approach which generates a signal representative of the output voltage of the driver, and in particular that compensates for the impact of the leakage inductance of the output transformer.

SUMMARY OF THE INVENTION

The invention is defined by the claims.

According to examples in accordance with an aspect of the invention, there is provided a switch mode power converter, comprising:

an inverter comprising a high side switch and a low side switch connected in series with a first node between them;

a transformer having a primary side winding and a secondary side winding; and a first inductor in series with the primary side winding and connected to the primary side winding at a second node;

a second inductor magnetically coupled to the first inductor, the second inductor defining an output terminal at one end; and a controller for controlling the inverter, wherein the controller has an input for receiving a signal derived from the voltage at the output terminal.

This power converter makes use of an additional (second) inductor coupled to a first inductor. The first inductor may for example be an already required part of the switch mode power converter such as used for energy storage or forming part of a resonant tank, or else the first inductor may be added for the purposes of enabling the output terminal to be provided. This first inductor is in series with the transformer primary side winding. The primary side circuit for example already includes the first inductor that carries essentially the same current as the current that flows through the transformer primary side winding. This may be the case in LCC and LLC converters, for example.

The second inductor provides a simple method to measure the secondary side voltage at the primary side. The second inductor may be implemented by providing an extra winding to the existing first inductor, which then has a tap so that two inductors are defined by the single arrangement. The voltage across the extra winding is identical in shape and phase to the voltage across the leakage inductance and is used to compensate the error in voltage signal at the primary side winding of the output transformer, as caused by the leakage inductance. Thus, voltage sensing of the secondary side voltage is made more accurate based on voltage sensing at the primary side.

The sensed voltage may then be used as part of the control scheme of the converter. For example, it may be used to trigger protection when an excess voltage is detected at the output.

The converter may further comprise a series capacitor in series with the first inductor and a capacitor in parallel with the secondary side winding. This defines an LCC structure. Multiple secondary side windings are possible.

The second inductor may have an inductance approximately equal to a combined primary side series leakage inductance of the transformer.

By "combined primary side series leakage inductance" in this context is meant the sum of the primary side leakage inductance and the reflected secondary side leakage inductance. In particular, this combination represents (in a model of the transformer electrical characteristics) the effect of the imperfect coupling between the primary side and secondary side of the transformer. In the case of multiple secondary side windings, there might be multiple secondary side leakage inductances, that can still be translated as a secondary side leakage inductance reflected to the primary side.

In this way, the inductance of the second inductor is made equal to the leakage inductance it is intended to compensate. The leakage inductance may vary with temperature for example and it may not be known to a high degree of accuracy. Thus, the second inductor is selected to have a value which approximates the leakage inductance.

The second inductor may instead have a winding ratio with respect to the first inductor such that the second inductor has an inductance greater than a combined primary side series leakage inductance of the transformer.

In this way, the inductance of the second inductor is made larger than the leakage inductance it is intended to compensate. The measured voltage may then be scaled down.

The controller may have an input directly connected to the output terminal.

The voltage at the end of the second inductor then functions directly as a feedback signal for the controller.

Alternatively, the controller may have a combining circuit for combining signals at the second node and at the output terminal to derive a sensing signal which is provided to the controller.

In this case, the voltages at each end of the second inductor are processed, for example scaled, before being used as a feedback signal for the controller. This may for example be needed because only a ratio between integer numbers of turns of the second inductor and the first inductor is possible. The combining function is then used to improve the accuracy with which the leakage inductance is simulated.

The combining circuit may comprise a resistor network for combining voltages at the second node and the output terminal to provide a sensing signal voltage.

This resistor network may be used for providing a weighted combination of voltages or deriving any other function between the voltages at each end of the second inductor.

The combining circuit may instead comprise a circuit for generating a sensing signal current. The feedback signal provided to the controller may thus be a voltage or a current. However, even when a current is used as the feedback signal, it is still dependent on the voltage at the output node and hence the voltage across the second inductor.

The second inductor may have a first end connected to the second node and the output terminal at a second end. In this way, the second inductor is connected such that the compensation (e.g. signal subtraction) for the combined leakage inductance (represented at the primary side) is achieved by the component placement.

Alternatively, the second inductor may have a first end connected to ground and the output terminal at a second end. The compensation (e.g. signal subtraction) may then be carried out by the controller.

The converter may comprise a resonant converter with a resonant tank connected to the first node, the resonant tank comprising at least the first inductor.

The converter may further comprise a rectifier connected to the secondary side winding, and a storage capacitor across the rectifier output.

The converter thus delivers a DC output for a DC load.

In one set of examples, the rectifier comprises a four-diode bridge connected across the secondary side winding. In another set of examples, the transformer has first and second secondary side windings in series, with a node defined between them, wherein the rectifier (D1-D4) comprises a two diode arrangement.

By "two diode arrangement" is meant that the rectifier function is implemented with only two unidirectional conduction paths. Each path may have a single diode, but of course the same functionality would be achieved with each path having multiple diodes in series.

The series connection of the first and second secondary side windings may include a component between them, for example a diode of the rectifier.

Thus, different rectifier designs are possible according to the design of the secondary side of the transformer.

The invention also provides a lighting circuit comprising:
a converter as defined above; and
a lighting load in parallel with the storage capacitor.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
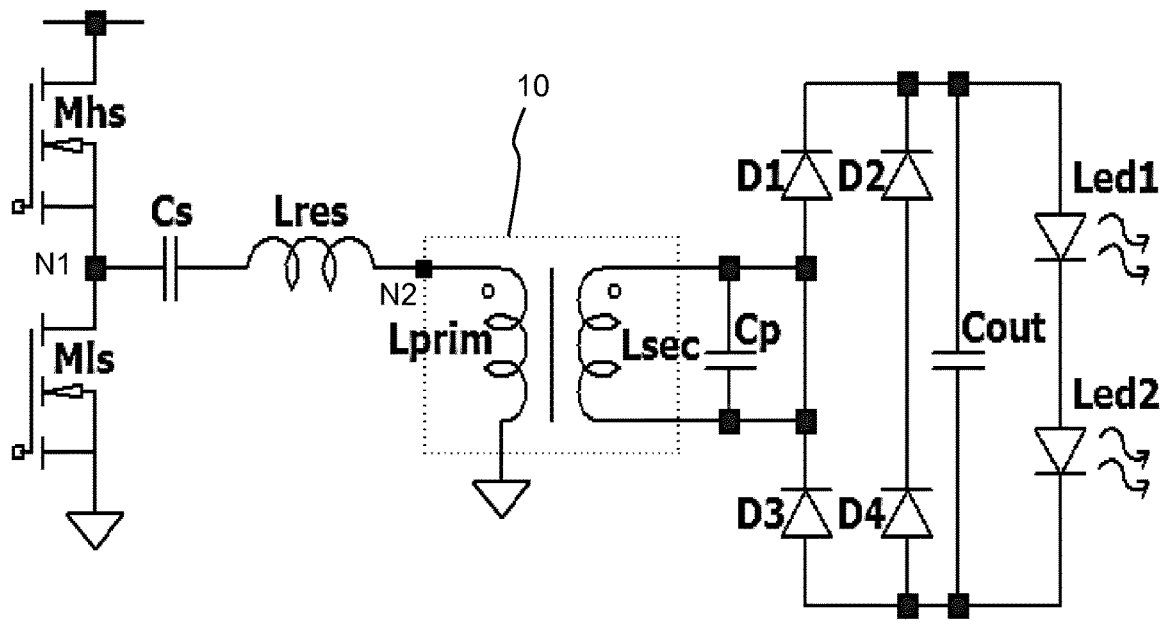
FIG. 1 shows an example of an LCC resonant switch mode power supply within an LED driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a switch mode power converter, comprising an inverter, a transformer having a primary side winding and a secondary side winding and a first inductor in series with the primary side winding. A second inductor is provided magnetically coupled to the first inductor, and a voltage at one end of the second inductor is used as a feedback signal for indirectly measuring (i.e. approximating) the secondary side voltage, but with measurement at the primary side.

The invention will be described with reference to LCC resonant switch mode power supplies, but the invention is applicable more generally to other resonant tank designs and also to switch mode power supplies more generally.

FIG. 1 shows an example of an LCC resonant switch mode power supply within an LED driver, and with an isolated output.

A rectified mains input (or DC input for a DC/DC power converter) is provided to a half bridge inverter formed of a high side MOSFET Mhs and a low side MOSFET Mls. This inverter controls the conversion operation, and the switching is controlled using feedback or feedforward control, in order to generate the required output. Each switch of the inverter has its timing of operation controlled by its gate voltage.

A resonant tank is formed by a series capacitor Cs and a series inductor Lres at the primary side of the output transformer 10 (comprising a primary side winding Lprim and a secondary side winding Lsec), and a parallel capacitor Cp at the secondary side of the output transformer 10. There may be multiple parallel capacitors, for example if there are multiple secondary side windings. Note that Lprim and Lsec represent the physical windings (to which circuit components may be connected).

The combined leakage inductances effectively add to the series inductor Lres. By placing the parallel capacitor Cp at the output side; the system still behaves as a 3rd order system (with the inductor of the LCC tank being the sum of Lres and the leakage inductances, discussed further below).

The output is provided to the LED load Led1, Led2 through a diode bridge rectifier D1 to D4 and a smoothing output capacitor Cout.

During operation of the converter, a controller (first shown in FIG. 4) controls the switches of the inverter, at a particular frequency and in essentially complementary manner ("essentially" complimentary, in that there may be a non-overlap time period). A high gate drive signal turns on one switch and turns off the other switch and a low gate drive signal turns off the one switch and turns on the other switch.

In one known approach, the primary side circuit detects a variable which indicates an average value over time of a current flowing in the circuit, for example through the first or second switch. Information about the load is derived on the basis of the measured current in the primary side circuit. The measured current may have a direct relationship with the load.

FIG. 1 shows a full-bridge rectifier at the secondary side and a single secondary side winding Lsec which couples at its ends to the rectifier circuit. Examples of circuits with multiple secondary side windings are further below. Such circuits may instead use rectifiers with only two diodes.

This is an example of an LCC resonant tank circuit, but LLC circuits and other resonant circuits are also possible, as well as non-resonant converters.

The general operation of switch mode power converters, including resonant converters, will be well known to those skilled in the art.

The input to the resonant tank is a node N1 at which a generally square wave high voltage AC signal is present. It is a "generally" square wave signal in that there may be sloped transitions. If there are sloped transitions, then during such sloped transitions, both transistors must be off. The frequency of this AC signal matches the switching frequency of the transistors Mhs and Mls, and is typically in the kHz range, for example 10 kHz to 300 kHz. The amplitude of the signal at this point may for example vary over time, particularly if the input is a rectified mains signal. There is then a low frequency envelope for the high frequency signal at node N1.

The circuit of FIG. 1 includes a magnetic element Lres at the primary side that carries essentially the same current that flows through the primary side winding Lprim of the transformer 10.

The invention involves providing an additional, second, inductor, preferably by providing additional windings to the existing series inductor, Lres in this example. Thus, there is then a series first inductor and a second inductor. The second inductor serves as a sensing element.

The invention is of particular interest for switch mode power converter circuits with such a series inductor. However, a series inductor (to form the first inductor) may be added to a circuit which does not already have such a component, again with additional windings to define an additional, second, inductor.

The result is that voltage across the second inductor will have the same shape and phase as the voltage that drops across the leakage inductance of the transformer. When adding a dedicated magnetic element to function as the first inductor, an inductance can be chosen that has minimum impact on the circuit function.

By subtracting the voltage across the second inductor from the voltage which can be measured at the primary side of the output transformer, a better, more accurate primary side representation of the output voltage of the driver is obtained. This subtraction may be performed by a controller, or else the circuit arrangement may itself implement the subtraction.

FIG. 1 shows a first node N1 between the transistors and a second node N2 at which the primary side winding connects to the first inductor Lres. This node N2 is accessible, meaning the voltage at this point can be monitored.

If the other side of the primary side winding is connected to ground, the voltage at node N2 with respect to ground will be the voltage across the primary side winding. There may be other series components, such as capacitors, for example between the other end of the primary side winding Lprim and ground (or between the primary side winding and the bus voltage which supplies the transistor inverter). The approach of the invention may be applied to all of these possibilities.

Figure 2:
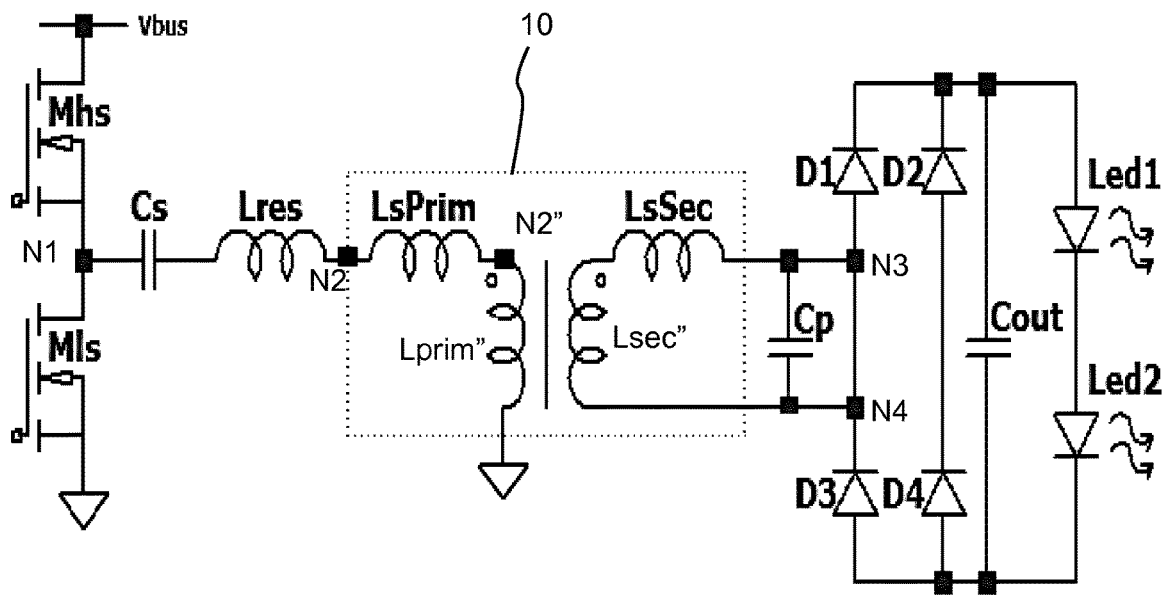
FIG. 2 shows the power supply of FIG. 1 with leakage inductances shown.

As shown in FIG. 2, the non-ideal magnetic coupling between the primary and secondary side of the transformer 10 can be depicted as a leakage inductance at the primary side LsPrim and a leakage inductance LsSec at the secondary side. The physical windings are then represented by the combination of a leakage inductance LsPrim, LsSec and an idealized winding Lprim", Lsec".

The voltage between the node N2 and ground is no longer a good representation of the secondary side AC voltage between nodes N3 and N4. A notional node NT' is defined between the leakage inductance at the primary side LsPrim and the (idealized) primary side winding Lprim", but this is not an accessible point in the circuit.

Voltages will develop across the leakage inductances LsPrim and LsSec due to current flowing through these leakage inductances.

Figure 3:
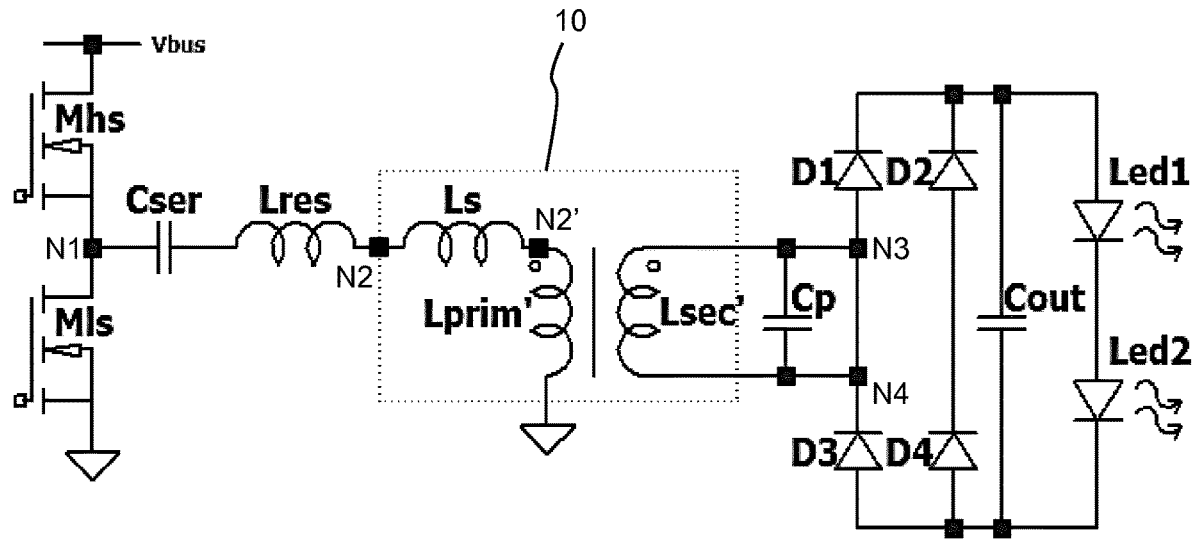
FIG. 3 shows the power supply of FIG. 2 with the leakage inductances translated to the primary side.

In FIG. 3, the secondary side leakage inductance LsSec is further transformed to the primary side, by scaling the impedance with the square of the transformer ratio. By combining the transformed secondary side leakage inductance LsSec with the primary side leakage inductance LsPrim a single, summed leakage inductance Ls results. The secondary side leakage inductance is thus removed from the secondary side as it has been represented instead at the primary side.

This combined primary side leakage inductance Ls may be considered to be the effective primary and secondary side leakage inductance(s) of the transformer, fully represented at the primary side of the transformer.

A notional node NT is now defined between this combined primary side leakage inductance Ls and the (representation of the) primary side winding Lprim'. The voltage between this node NT and ground is then a better representation of the voltage across the primary side winding Lprim' but this again is not an accessible point in the circuit.

Note that this is based on a model representation of the transformer, as an ideal transformer in combination with additional leakage (i.e. parasitic) components. One such model is known as the cantilever model, although others may be used. Any suitable model may be used to represent all leakage inductances at the primary side. Note that the cantilever model results in a turns ratio for the ideal transformer which can differ from the actual physical turns ratio. It is also noted that Lprim", Lsec" and N2" of FIG. 2 are different to Lrpim', Lsac' and NT of FIG. 3 as a result of the different representations of the transformer.

Figure 4:
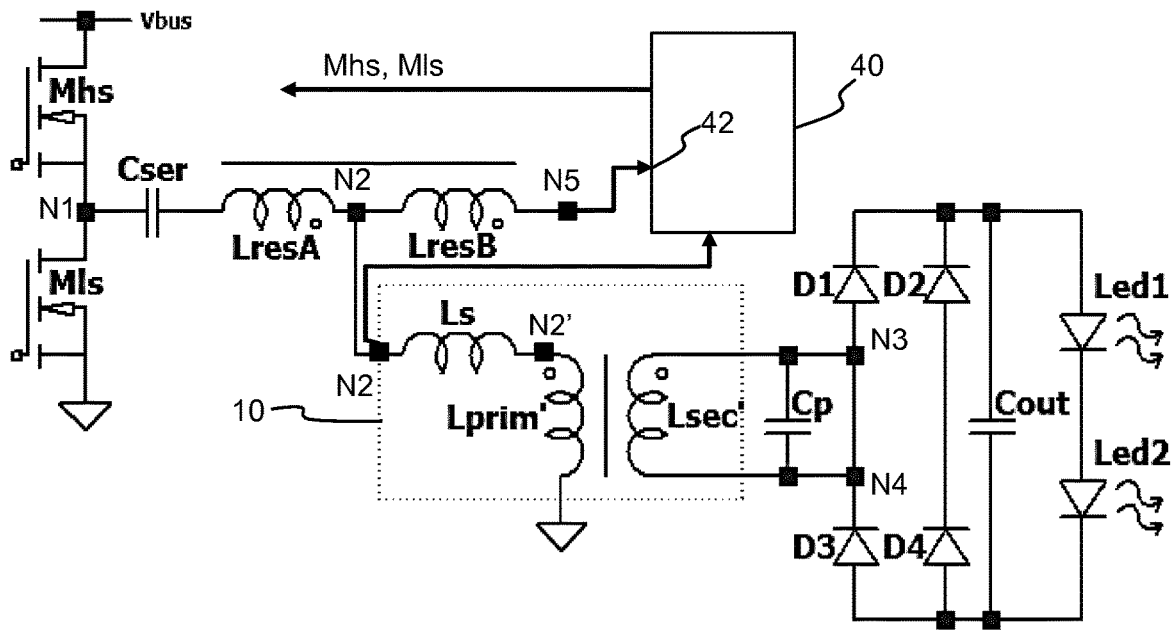
FIG. 4 shows a first example of power supply in accordance with the invention.

FIG. 4 shows a first example of a circuit in accordance with the invention, based on the transformer representation of FIG. 3. The first inductor has been named LresA. A second inductor LresB is provided having a first end connected to the second node N2 and an output terminal, node N5, at the second end. The first inductor and the second inductor are magnetically coupled, hence the first inductor is now named LresA and the second inductor is named LresB. Together, they may be a single inductor with a tap which defines the junction between them. Separate inductors, sharing a magnetic core, are also possible.

In FIG. 3, the current flowing through the first inductor Lres and through the leakage inductance Ls are the same because they are in series, so that the shape and phase of the voltage across Lres and Ls will be the same.

When adding the second inductor as in FIG. 4, resulting in a main first inductor LresA (formed from a main first winding) and a second inductor LresB (formed from an additional winding), the magnetic coupling between LresA and LresB is assumed to be good, which is very feasible, as no significant isolation is required between the two windings. Some leakage inductance would however not be an issue, as no substantial current flows in the second inductor LresB.

The end of the second inductor, opposite node N2, forms the node N5 which is the output terminal. It connects to a controller 40. The controller 40 has an input 42 for receiving a voltage (or a current in an alternative example) derived from the voltage at the output terminal N5. In the example of FIG. 4, the controller input draws minimal current so that substantially no current flows through the second inductor LresB.

By subtracting the voltage across the second inductor from the voltage which can be measured at the primary side of the output transformer (measured at node N2), a better, more accurate primary side representation of the output voltage of the driver is obtained.

Because the voltage across the second inductor LresB has the same shape and phase as the voltage across the first inductor LresA, it also has the same shape and phase as the voltage across the leakage inductor Ls.

With a suitable turns ratio between the inductors LresB and LresA, the voltage at node N5 can be tuned to be essentially the same as the voltage at node NT, thus providing a physically accessible node carrying the desired, correct representation of the AC output voltage between nodes N3 and N4. Thus, primary side measuring is enabled for limiting or controlling the output voltage of the driver.

The turns ratio between LresB and LresA can only be tuned to compensate for a nominal value of the primary side leakage inductance Ls, and thus the voltage at node N5 (relative to ground) will only be essentially the same as the node NT in FIG. 3 (relative to ground) for the nominal value of the leakage inductance Ls.

Any deviation of the leakage inductance from its nominal value will result in an imperfection in the node N5 voltage compared to the voltage at node NT in FIG. 3. However, the use of a signal at node N5 will still be substantially better than when using the signal at node N2.

In FIG. 4, one end of the second inductor LresB connects to the node N2. This automatically creates the sum of the voltage at N2 plus the voltage across the second inductor LresB at node N5. Thus, the circuit provides the required summation/subtraction. However, this is not essential.

Figure 5:
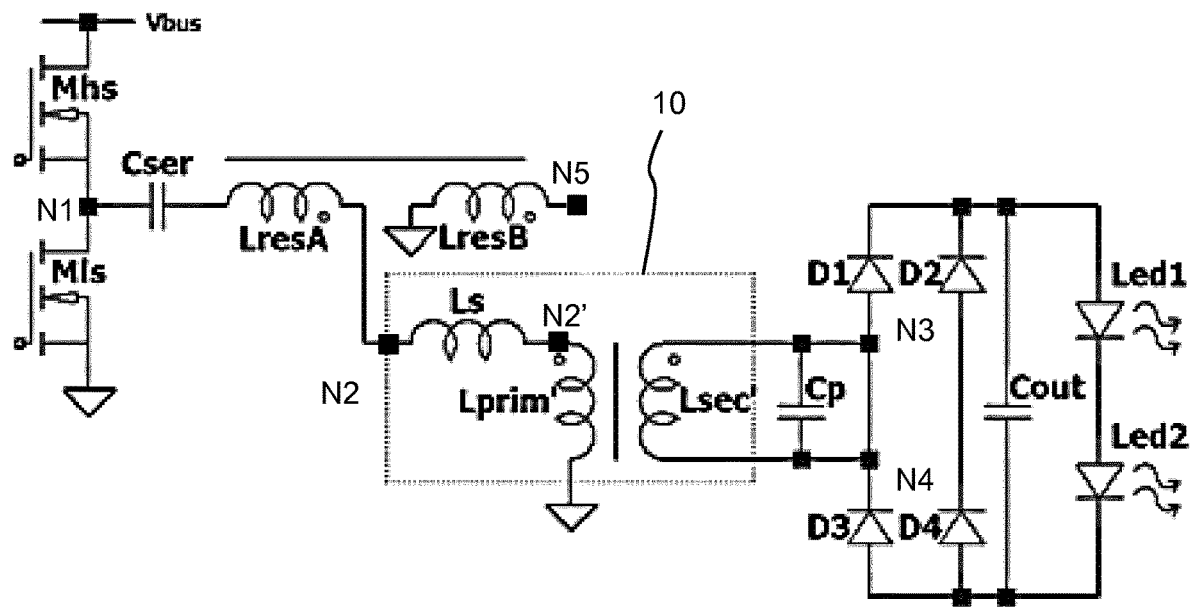
FIG. 5 shows a second example of power supply in accordance with the invention.

FIG. 5 shows a modification in which one end of the second inductor LresB is connected to ground and the other end forms the node N5. In this way, an isolated auxiliary winding may be used for compensating the primary side voltage signal for the impact of the output transformer leakage inductance Ls. The addition/subtraction may be implemented by a separate circuit or by the controller.

The fact that the second inductor LresB is magnetically coupled to the first inductor LresA is sufficient to enable a representation of the leakage inductance Ls. This provides an alternative method of creating a weighted sum of the voltage at node N2 and the voltage across the second inductor LresB.

The examples above make use of a single secondary side winding for the transformer, but there are other possibilities.

FIGS. 6 to 9 show alternative arrangements to which the invention may be applied, but without showing the second inductor of the invention. The second inductor may be added in the manner shown in FIG. 4 or 5.

Figure 6:
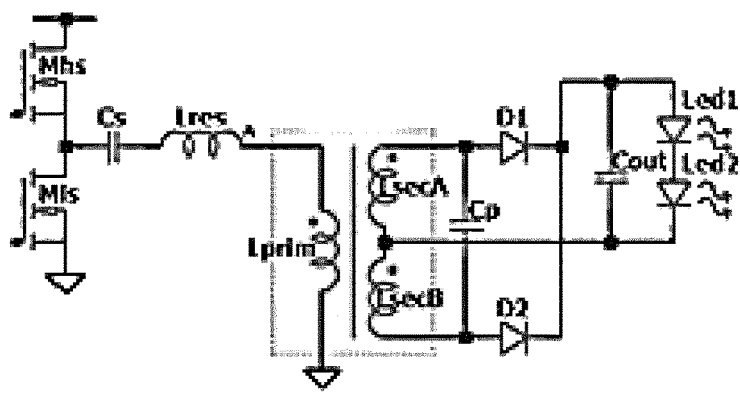
FIGS. 6 to 9 show different examples of input capacitor, output capacitor, transformer windings and rectifier configurations which may be employed.

FIG. 6 shows the secondary side of the transformer as two series secondary side windings LsecA and LsecB. The junction between them provides a first output terminal and the two end terminals connect via a two-diode rectifier to a second output terminal.

There may be a single parallel secondary side capacitor Cp as shown, or there may instead be one capacitor per winding, namely a capacitor CpA in parallel with LsecA and a capacitor CpB in parallel with LsecB.

Figure 7:
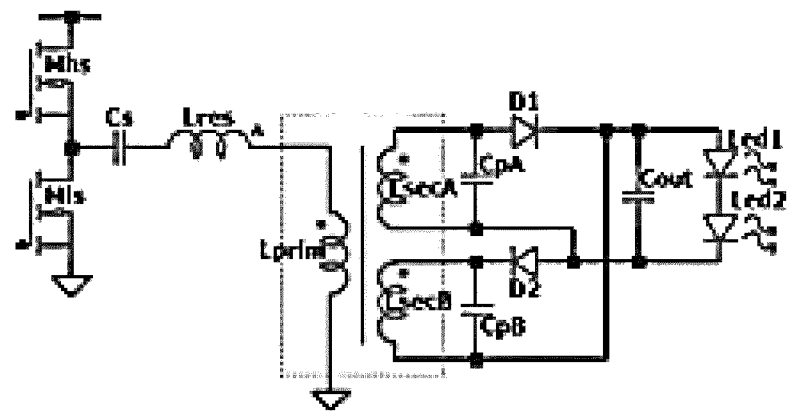

FIG. 7 shows a variant of FIG. 6, which has advantages in terms of isolation requirements between LsecA and LsecB and in terms of EMI performance. In this design, there is a parallel capacitor across each secondary side winding, and one of the diodes of the two-diode rectifier is between the secondary side windings.

The transformer in FIG. 7 again has first and second secondary side windings LsecA, LsecB in series, with a node (the anode of diode D2, one of the diodes of the two-diode rectifier) defined between them. It defines a first output node. The cathode of diode D1, another of the two-diode rectifier connects to a second output node.

In this case it is not possible to place a single parallel capacitor Cp across the two secondary side windings.

Figure 8:
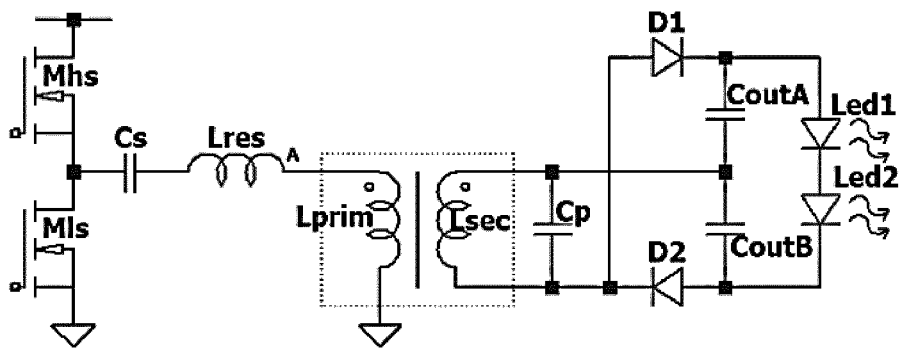

FIG. 8 shows another example which operates as a voltage doubler. The output capacitor Cout is now split into two capacitors CoutA and CoutB that are placed in series. There may be a further capacitor Cout across the LEDs.

The transformer in FIG. 8 has a single secondary side winding Lsec. The rectifier again comprises two diodes and defines both output nodes in the same way as in FIG. 6.

Figure 9:
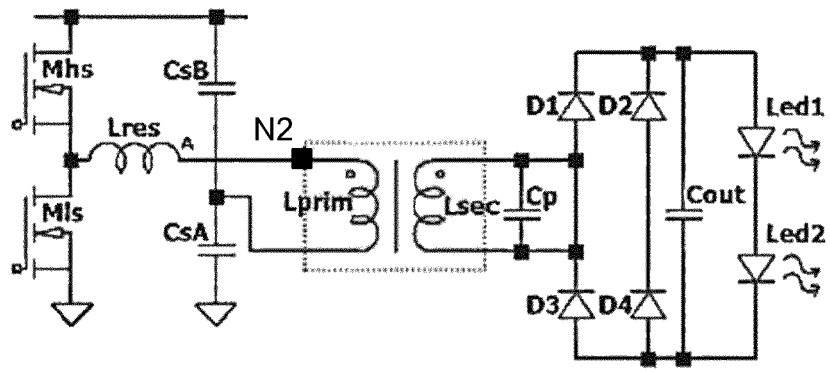

FIG. 9 shows a configuration with a different position of the series capacitor Cs at the primary side. The capacitor Cs is formed as two series capacitors CsB and CsA between the bus voltage and ground. One end of the primary side winding Lprim connects to the junction between the two capacitors and the other end connects to the first inductor Lres. The series capacitor may in fact be placed in the position of CsA, of CsB or both (as shown), all effectively being equivalent. This equivalence is because the bus voltage (which is the supply to the inverter) is normally decoupled from ground via a large capacitance.

Normally Cs is large, so the bottom-side of the primary side winding Lprim now references to the (almost) DC voltage at the node between CsA and CsB. Thus, only the AC component of the voltage at node N2 is indicative of the output voltage. When combining the voltage at node N2 with the voltage across LresB in accordance with the invention, only the AC component needs to be considered.

If the first inductor (LresA in FIGS. 4 and 5) is a primary component of the switch mode power converter (i.e. if it is not added simply to enable the LresB inductor to be provided), then the power converter task of the inductor LresA is leading for the design of the inductor LresA (the core, air gap, turns, wire etc.). The main first inductor LresA inductance is then typically large compared to the leakage inductance and hence also compared to the second inductor LresB. Thus, the number of turns of the second inductor LresB winding will be relatively small. Because winding turns come in integers, it may not be possible to tune the inductance of the second inductor LresB to exactly match the nominal leakage inductance Ls.

One option is to use the next higher integer number of turns for the second inductor LresB, or indeed an even greater number of turns. This makes the voltage at node N5 overcompensated for the impact of the leakage inductance Ls. This overcompensation may be taken into account based on the realization that node N2 is not compensated for the impact of the Ls leakage inductance.

In particular, a combining circuit may be used for combining signals at the second node N2 and at the output terminal (node N5) to derive a sensing signal which is provided to the controller. In this way, the amount of compensation can be tuned to match more exactly the impact of the leakage inductance Ls. For example, a weighted sum of the voltages at node N2 and at node N5, or other combination function, may be used as the representation of the output voltage of the driver. This representation is then used as the feedback signal to limit or control the output voltage.

Figure 10A:
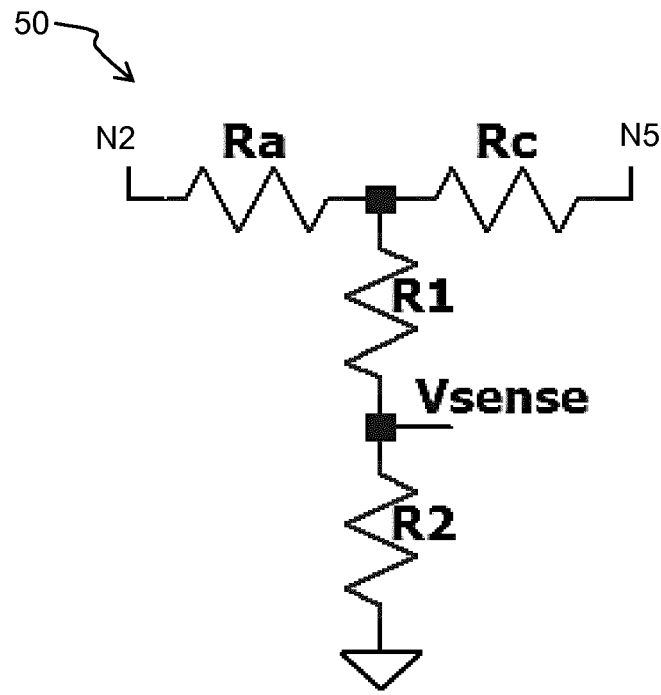
FIGS. 10A and 10B shows two examples of combination circuit which may be used to make the approximation to the leakage inductance more accurate.

FIG. 10A shows one example of a combining circuit 50 in the form of a resistor network for combining voltages at the second node N2 and the node N5 to provide a sensing signal voltage Vsense.

This circuit comprises a first resistor divider formed of resistances Ra, Rc, and a second resistor divider formed of resistances R1, R2. This circuit yields:

$$V\text{sense} = (V_{N2} * Rc + V_{N5} * Ra)/(Ra+Rc) * R2/(Ra//Rc+R1+R2)$$

Where $V_{N2}$ is the voltage at node N2, $V_{N5}$ is the voltage at node N5, and Ra//Rc signifies the parallel combination of resistances Ra and Rc.

This circuit thus provides a weighted sum. Of course many other passive circuit designs may be used.

R2 may instead be an open circuit and R1 a short circuit, so that a simple voltage divider is present between N2 and N5.

Figure 10B:
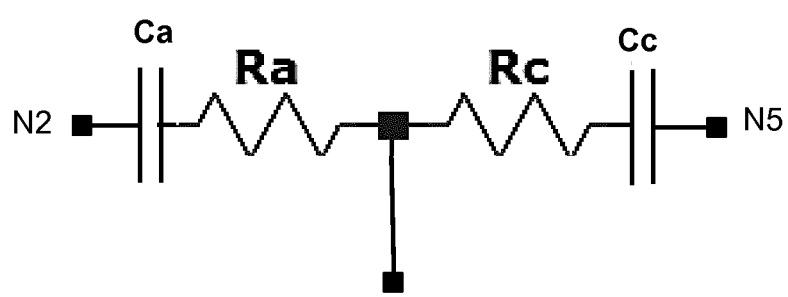

As shown in FIG. 10B, a current signal Isense can instead be generated by short circuiting R1, and connecting the node Isense node to a fixed voltage (e.g. an IC-pin) instead of connecting to ground through R2. The current entering that pin or being drawn from that pin is then a representation of the output voltage of the driver. The combining circuit may thus comprise a circuit for generating a sensing signal current.

If the constant voltage of the Isense node is zero (Ground), both Ca and Cc can be omitted, If the constant voltage is not equal to zero at least Cc is required to support the DC voltage of the pin while Ca can be omitted as long as the voltage at node N2 is large compared to the constant voltage.

The series capacitors for example enable the AC signal processing explained above with reference to FIG. 9.

As described above, the invention is particularly attractive in circuits where there already is a magnetic element (Lres) carrying the same current as the primary side winding of the transformer, such as in an LCC converter.

However, not all circuits with isolated output will already have a magnetic component such as Lres that conducts the same (or a scaled version of) the leakage current of the output transformer. In those cases, an additional series inductance (i.e. to form LresA) can be added to the existing circuit and equipped with an extra winding providing the function of LresB function to create the desired node N5. The first inductor LresA is then kept small, as it is not a required component of the power circuit.

The inductors LresA and LresB are referred to as first and second inductors. As explained above, they may be separate sections (i.e. windings) of a single inductor structure, or they may be separate inductors.

The invention provides an improvement that can be applied to (LED) drivers that have an output transformer with isolated output. The invention is particularly attractive to be used in LCC-type resonant convertor stages, as commonly used in isolated LED drivers.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A switch mode power converter, comprising:
   an inverter comprising a high side switch and a low side switch connected in series with a first node between the high side switch and the low side switch;
   a transformer having a primary side winding and a secondary side winding; and
   a first inductor in series with the primary side winding and connected to the primary side winding at a second node;
   a second inductor magnetically coupled to the first inductor, the second inductor defining an first end coupled to the primary side winding and an output terminal at a second end counted to a controller; and
   wherein the controller for controlling the inverter, wherein the controller has an input for receiving a signal derived from the voltage at the output terminal, wherein the second inductor has an inductance approximately equal to or greater than a combined primary side series leakage inductance of the transformer.

2. The converter as claimed in claim 1, further comprising a series capacitor in series with the first inductor and a capacitor in parallel with the secondary side winding.

3. The converter as claimed in claim 1, wherein the controller has an input directly connected to the output terminal.

4. The converter as claimed in claim 1, wherein the controller has a combining circuit for combining signals at the second node and at the output terminal to derive a sensing signal which is provided to the controller.

5. The converter as claimed in claim 4, wherein the combining circuit comprises a resistor network-for combining voltages at the second node and the output terminal to provide a sensing signal voltage.

6. The converter as claimed in claim 4, wherein the combining circuit comprises a circuit for generating a sensing signal current.

7. The converter as claimed in claim 1, wherein the second inductor has a first end connected to the second node and the output terminal at a second end.

8. The converter as claimed in claim 1, wherein the second inductor has a first end connected to ground and the output terminal at a second end.

9. The converter as claimed in claim 1, comprising a resonant converter with a resonant tank connected to the first node, the resonant tank comprising the first inductor.

10. The converter as claimed in claims 1, further comprising a rectifier connected to the secondary side winding, and a storage capacitor across the rectifier output.

11. The converter as claimed in claim 10, wherein the rectifier comprises a four-diode bridge connected across the secondary side winding.

12. The converter as claimed in claim 10, wherein the transformer has first and second secondary side windings in series, with a node defined between the second secondary windings in series, wherein the rectifier comprises a two diode arrangement.

13. A lighting circuit comprising:
    the converter as claimed in claim 10, and
    a lighting load in parallel with the storage capacitor.

* * * * *